United States Patent
Nishimoto

(10) Patent No.: US 12,431,788 B2
(45) Date of Patent: Sep. 30, 2025

(54) POWER CONVERTER APPARATUS PROVIDED WITH RIPPLE CANCEL CURRENT GENERATOR CIRCUIT

(71) Applicant: Panasonic Intellectual Property Management Co., Ltd., Osaka (JP)

(72) Inventor: Taiki Nishimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 324 days.

(21) Appl. No.: 18/255,304

(22) PCT Filed: Dec. 10, 2021

(86) PCT No.: PCT/JP2021/045518
§ 371 (c)(1),
(2) Date: May 31, 2023

(87) PCT Pub. No.: WO2022/124395
PCT Pub. Date: Jun. 16, 2022

(65) Prior Publication Data
US 2024/0030804 A1    Jan. 25, 2024

(30) Foreign Application Priority Data
Dec. 11, 2020    (JP) .................. 2020-206190

(51) Int. Cl.
*H02M 1/15* (2006.01)
*H02M 3/158* (2006.01)
*H02M 1/14* (2006.01)

(52) U.S. Cl.
CPC ............ *H02M 1/15* (2013.01); *H02M 3/158* (2013.01); *H02M 1/143* (2013.01)

(58) Field of Classification Search
CPC .......................... H02M 3/155–1588
See application file for complete search history.

(56) References Cited

U.S. PATENT DOCUMENTS

| 5,640,315 A | 6/1997 | Hirano et al. |
| 5,905,369 A | 5/1999 | Ishii et al. |
| (Continued) | | |

FOREIGN PATENT DOCUMENTS

| CN | 103887958 B | * | 1/2017 |
| CN | 115811210 A | * | 3/2023 |
| (Continued) | | | |

OTHER PUBLICATIONS

Machine translation of Wang (CN 103887958) (Year: 2017).*
(Continued)

*Primary Examiner* — Peter M Novak
(74) *Attorney, Agent, or Firm* — Rimon P.C.

(57) ABSTRACT

A power converter apparatus includes: a pair of input terminals and a pair of output terminals; a first series circuit including a first inductor and a first switch element and being connected in parallel to the pair of input terminals; a switching circuit that switches, by using a second switch element, a voltage between both ends of the first switch element; a power converter circuit that converts an input voltage inputted to the pair of input terminals to a predetermined output voltage and then outputs the output voltage to the pair of output terminals; and a ripple cancellation current generator circuit that, in case of the first switch element being turned on and off, generates a ripple cancellation current for cancelling a ripple current generated by accumulation and discharge of current energy to and from the first inductor.

14 Claims, 16 Drawing Sheets

(56) References Cited

U.S. PATENT DOCUMENTS

| | | | |
|---|---|---|---|
| 2004/0189268 A1* | 9/2004 | Li | ............... H02M 3/1588 323/282 |
| 2016/0315552 A1 | 10/2016 | Nishimoto et al. | |
| 2021/0367504 A1* | 11/2021 | Angell | ............... H02M 1/14 |

FOREIGN PATENT DOCUMENTS

| | | |
|---|---|---|
| JP | H07-264849 A | 10/1995 |
| JP | 3570113 B2 | 9/2004 |
| JP | 5971607 B1 | 8/2016 |

OTHER PUBLICATIONS

Machine translation of Bao (CN 115811210) (Year: 2023).*
International Search Report dated Feb. 22, 2022 issued in International Patent Application No. PCT/JP2021/045518, with English translation.
International Preliminary Report on Patentability dated Jun. 22, 2023 issued in International Patent Application No. PCT/JP2021/045518, with English translation.

* cited by examiner

POWER CONVERTER APPARATUS PROVIDED WITH RIPPLE CANCEL CURRENT GENERATOR CIRCUIT

CROSS-REFERENCE OF RELATED APPLICATIONS

This application is the U.S. National Phase under 35 U.S.C. § 371 of International Patent Application No. PCT/JP2021/045518, filed on Dec. 10, 2021, and published on Jun. 16, 2022, which in turn claims the benefit of Japanese Patent Application No. 2020-206190, filed on Dec. 11, 2020, the entire disclosures of which applications are incorporated by reference herein.

TECHNICAL FIELD

The present disclosure relates to a power converter apparatus such as a switching power supply circuit.

BACKGROUND ART

In a switching power supply circuit such as a step-up converter, a triangular wave-shaped ripple current is generated by repeating accumulation and release of magnetic (current) energy in a reactor. If the ripple current propagates outside the switching power supply circuit, electromagnetic noise may adversely affect other electronic devices. Therefore, it is necessary to suppress propagation of the ripple current inside the switching power supply circuit.

Patent Document 1 discloses a method for suppressing the ripple current by an interleaving method. In the case of the two-phase interleaving, odd-order harmonic components among frequency components included in the triangular wave-shaped ripple current can be suppressed. On the other hand, when the inductances of the reactors are the same as each other, the even-order harmonic components increase by 6 dB (twice).

Patent Document 2 discloses a suppression method by a frequency spread control method. The switching frequency is changed to prevent noise energy from concentrating on a single frequency. When the switching frequency is changed from 90 kHz to 110 kHz, the energy of the fundamental wave is dispersed at 90 kHz to 110 kHz (in a range of 20 kHz), and the energy of the second harmonic wave is dispersed at 180 kHz to 220 kHz (in a range of 40 kHz). That is, in the high-order harmonics, the dispersion range is wide, and a large suppression effect can be obtained. On the other hand, the suppression effect is limited in the fundamental wave and the low-order harmonics. In addition, when the peak value detection (peak detection) is used as a noise observation method, a noise suppression effect cannot be obtained.

Patent Document 3 discloses a suppression method using a bypass circuit. By magnetically coupling the inductor with the reactor of the bypass circuit, the fundamental component of the ripple current can be significantly suppressed. On the other hand, the effect of suppressing harmonic components is low.

PRIOR ART DOCUMENTS

Patent Documents

[Patent Document 1] Japanese Patent No. JP3570113B2
[Patent Document 2] Japanese Patent Laid-open Publication No. JPH7-264849A
[Patent Document 3] Japanese Patent No. JP5971607B1

SUMMARY OF THE INVENTION

Problems to be Solved by the Invention

However, as described above, the degree and range of the suppression effect are limited regardless of which technique is used. Therefore, in order to sufficiently suppress all frequency components of noise, a large noise filter is required. As a result, there is such a problem that downsizing of a power supply apparatus is hindered.

An object of the present disclosure is to solve the above problems and provide a power converter apparatus that is a switching power supply circuit such as a step-up converter, and can suppress all frequency components of a ripple current without using a large noise filter.

Means for Solving the Problems

According to one aspect of the disclosure, there is provided a power converter apparatus including a pair of input terminals, a pair of output terminals, and a power converter circuit. The power converter circuit includes a first series circuit of a first inductor and a first switch element connected in parallel to the pair of input terminals; and a switching circuit being configured to switch and output a voltage between both ends of the first switch element by using a second switch element. The power converter circuit is configured to perform power conversion of an input voltage inputted to the pair of input terminals into a predetermined output voltage and then output the predetermined output voltage to the pair of output terminals. The power converter apparatus includes a ripple cancellation current generator circuit being configured to, in case of the first switch element being controlled to be turned on and off, generate a ripple cancellation current that cancels out a ripple current generated by accumulation and release of current energy in the first inductor and inputs the ripple cancellation current to a pair of input terminals of the power converter apparatus to cancel out the ripple current. The ripple cancellation current generator circuit includes: a second inductor having one end connected to one of the pair of input terminals; a second series circuit connected between another end of the second inductor and the other of the pair of input terminals, the second series circuit being configured by connecting a third switch element and a first capacitor in series; a third series circuit connected in parallel to the second series circuit, the third series circuit being configured by connecting a fourth switch element and a second capacitor in series; and a power supply apparatus being configured to apply a predetermined applied voltage to the second capacitor.

Effect of the Invention

According to the power converter apparatus according to one aspect of the present disclosure, a triangular wave-shaped ripple current can be canceled out. That is, all the frequency components of the ripple current can be suppressed. As a result, it is possible to reduce the noise filter, reduce the size and weight of the apparatus, and reduce the cost as compared with the conventional power converter apparatus.

MODE FOR CARRYING OUT THE INVENTION

Figure 1A:
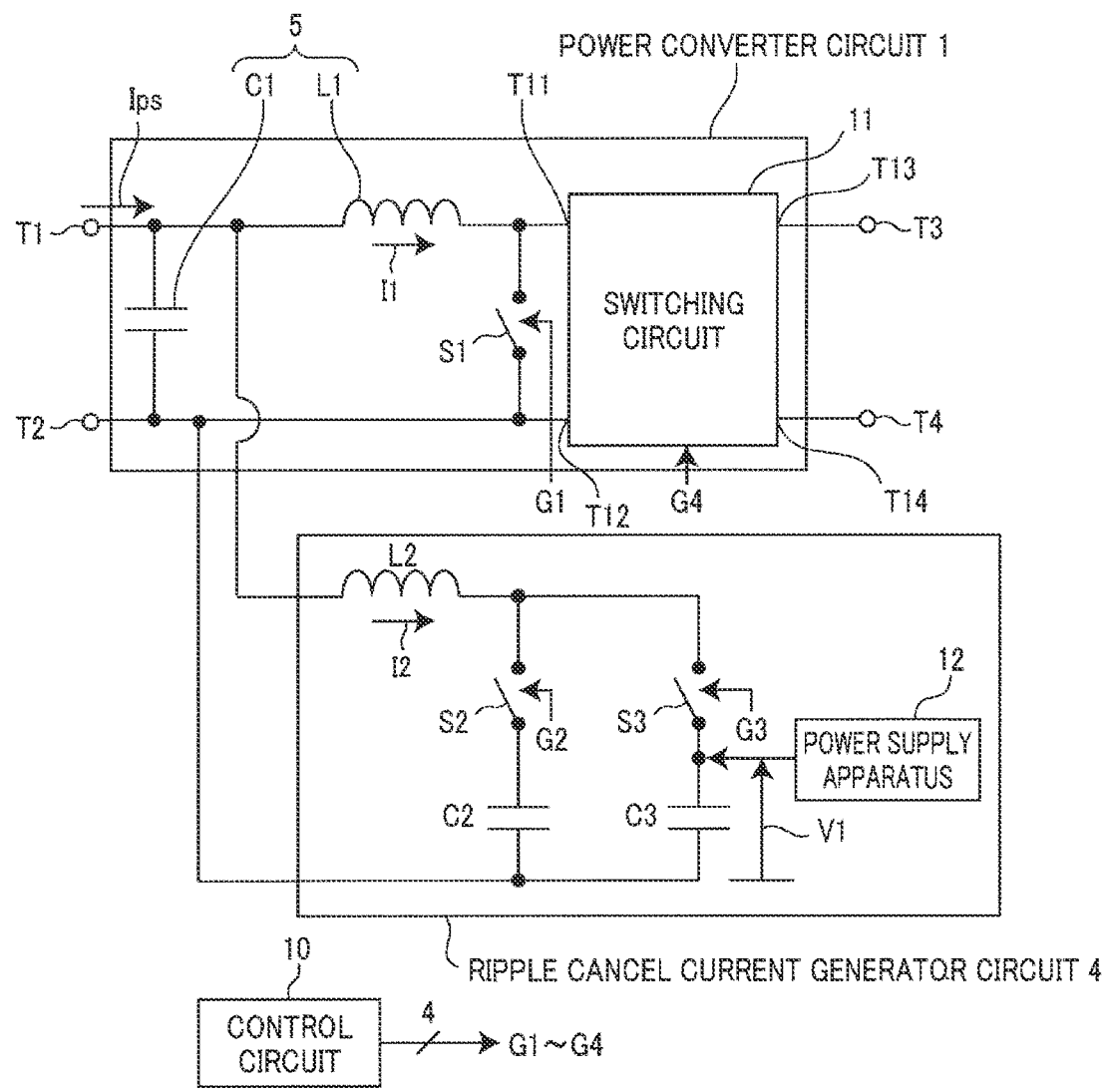
FIG. 1A is a block diagram showing a configuration example of a power converter apparatus according to a first embodiment.

Hereinafter, embodiments according to the present disclosure will be described with reference to the drawings. The same or similar components are denoted by the same reference numerals.

First Embodiment

FIG. 1A is a block diagram showing a configuration example of a power converter apparatus according to a first embodiment. The power converter apparatus of FIG. 1A is a power converter apparatus that is, for example, a DC/DC converter including a power converter circuit 1 that includes an inductor L1 and a switching circuit 11, performs power conversion such as DC/DC conversion on a voltage input to a pair of input terminals T1 and T2, and then outputs the converted voltage to a pair of output terminals T3 and T4. The power converter apparatus further includes a ripple cancellation current generator circuit 4 that generates a ripple cancellation current that cancels out a ripple current generated by accumulation and release of current energy in the inductor L1 in accordance with gate control signals G1 and G4 supplied from the control circuit 10 to the switching circuit 11, and inputs the ripple cancellation current to the input terminals T1 and T2 of the power converter apparatus to cancel out the ripple current.

Referring to FIG. 1A, the power converter circuit 1 includes the pair of input terminals T1 and T2 and the pair of output terminals T3 and T4, and includes a smoothing circuit 5, a switch element S1, and a switching circuit 11. In this case, the switching circuit 11 is, for example, a switching circuit 11-1 that is a step-up DC/DC converter in FIG. 5 or a switching circuit 11-2 that is a step-up/down type DC/DC converter (single ended primary inductor converter (SEPIC)) in FIG. 7.

The smoothing circuit 5 includes a smoothing capacitor C1 and an inductor L1 of a reactor. The smoothing capacitor C1 is connected in parallel to the input terminals T1 and T2, and the inductor L1 is connected between the input terminal T1 and an input terminal T1.1 of the switching circuit 11. In addition, the switch element S1 is connected in parallel to the input terminals T11 and T12 of the switching circuit 11, and is controlled to be turned on and off according to the gate control signal G1 from the control circuit 10. It is noted that the input terminal T2 is connected to the input terminal T12 of the switching circuit 11.

The switching circuit 11 includes the input terminals T1.1 and T12 and output terminals T13 and T14, switches the voltages input to the input terminals T11 and T12 in accordance with a gate control signal G4 from the control circuit 10, and then, outputs the voltages to the output terminals T3 and T4 via the output terminals T13 and T14.

The ripple cancellation current generator circuit 4 is connected in parallel to the input terminals T1 and T2 of the power converter circuit 1, and includes a power supply apparatus 12 for generating a predetermined applied voltage V1, the inductor L2, switch elements S2 and S3, and capacitors C2 and C3. In this case, the input terminal T1 is connected to the input terminal T2 via the inductor L2 and the series circuit of the switch element S2 and the capacitor C2, and is connected to the input terminal T2 via the inductor L2 and the series circuit of the switch element S3 and the capacitor C3. The power supply apparatus 12 generates the applied voltage V1, and applies the applied voltage V1 to the connection point between the switch element S3 and the capacitor C3. The switch elements S2 and S3 are controlled to be turned on and off in accordance with gate control signals G2 and G3 from the control circuit 10, respectively.

It is noted that switch elements S1 to S4 (switch elements S5 to S10 in the others embodiments) include, for example, MOS field-effect transistors, and the gate control signals G1 to G4 are applied to the gates of the switch elements S1 to S4 from the control circuit 10 so as to be controlled to be turned on and off.

Figure 1B:
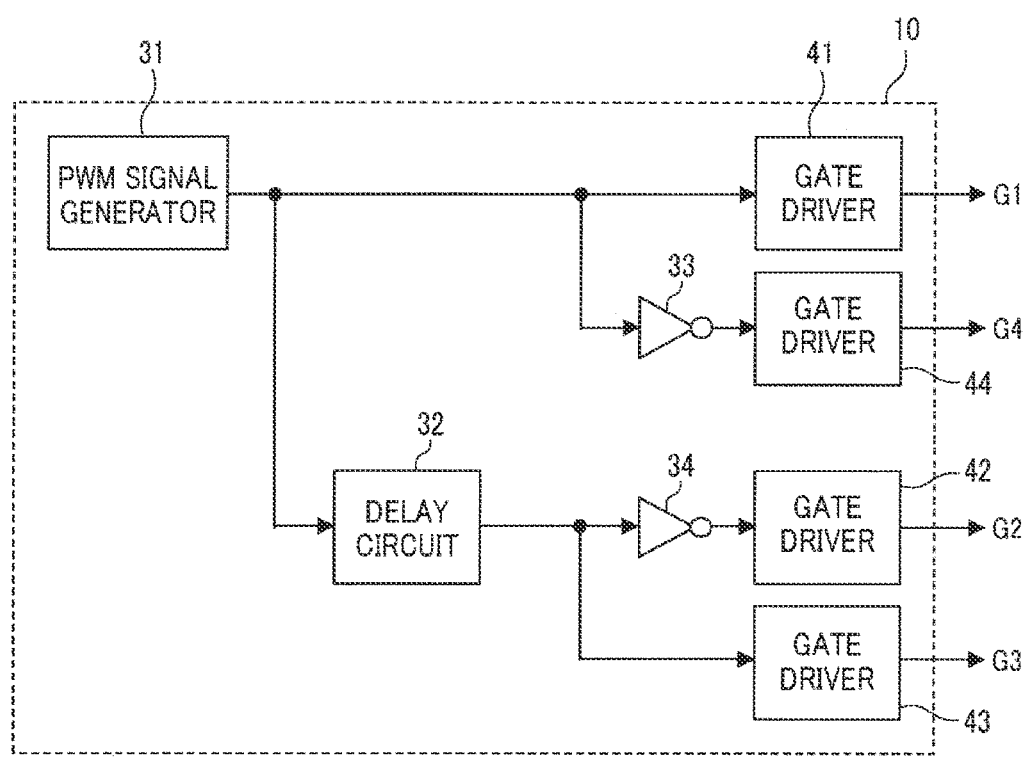
FIG. 1B is a block diagram showing a configuration example of a control circuit 10 of FIG. 1A.

FIG. 1B is a block diagram showing a configuration example of the control circuit 10 of FIG. 1A. Referring to FIG. 1B, the control circuit 10 includes a PWM signal generator 31, a delay circuit 32, inverters 33 and 34, and gate drivers 41 to 44.

Referring to FIG. 1B, the gate control signals G1 to G4 for driving the switch elements S1 to S4 are generated by the same control circuit 10, and are transmitted to the switch element S1 of the power converter circuit 1, the switch element S4 (described later) of the switching circuit 11, and the switch elements S2 and S3. As a result, it is possible to prevent the switching timing from being shifted between the power converter circuit 1 and the switch elements S2 and S3. When the switching timing is shifted, the effect of suppressing the ripple current may be weakened. Therefore, the power converter apparatus of FIG. 1A can compensate for the effect of suppressing the ripple current.

Furthermore, in the control circuit 10, a delay may be applied to one of the gate control signals G1 and G4 and the gate control signals G2 and G3 by the delay circuit 32, for example, so as to correct a difference in switching speed (transition time) between the switch element S1 and the switch elements S2 and S3. For example, as shown in FIG. 1B, after generating a predetermined PWM signal, the PWM signal generator 31 is configured to:

(1) generate the gate control signal G1 via the gate driver 41;
(2) generate the gate control signal G4 via the inverter 33 and the gate driver 44;
(3) generate the gate control signal G2 via the delay circuit 32, the inverter 34, and the gate driver 42; and
(4) generate the gate control signal G3 via the delay circuit 32 and the gate driver 43.

It is assumed that a component having a smaller rated current is used for the switch elements S2 and S3 than the switch element S1. Since a component having a smaller rated current tends to have a higher switching speed, it is possible to prevent the suppression effect from being weakened by the difference.

Figure 2:
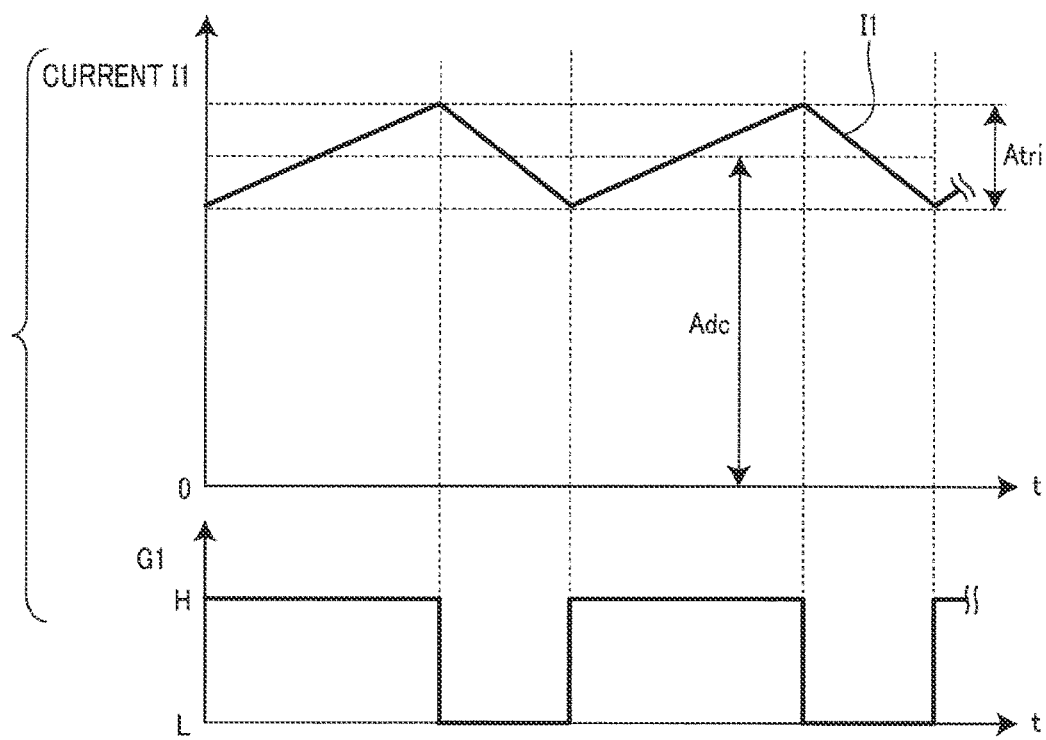
FIG. 2 is a timing chart showing a current I1 flowing through an inductor L1 with respect to a gate control signal G1 of FIG. 1A.

FIG. 2 is a timing chart showing a current I1 flowing through the inductor L1 with respect to the gate control signal G1 of FIG. 1A. In the timing chart of FIG. 2 and subsequent drawings, when each gate control signal is at a high level, the switch element applied to the gate is turned on, and when each gate control signal is at a low level, the switch element applied to the gate is turned off.

Referring to FIG. 1A, a voltage Vin is inputted between the input terminals T1 and T2. When the switch element S1 is turned on, the magnetic energy is accumulated in the inductor L1. On the other hand, when the switch element S1 is turned off, the magnetic energy of the inductor L1 is released. Accordingly, the current flowing through the inductor L1 becomes the sum of the DC amplitude Adc and the triangular wave amplitude Atri as shown in FIG. 2.

Figure 3:
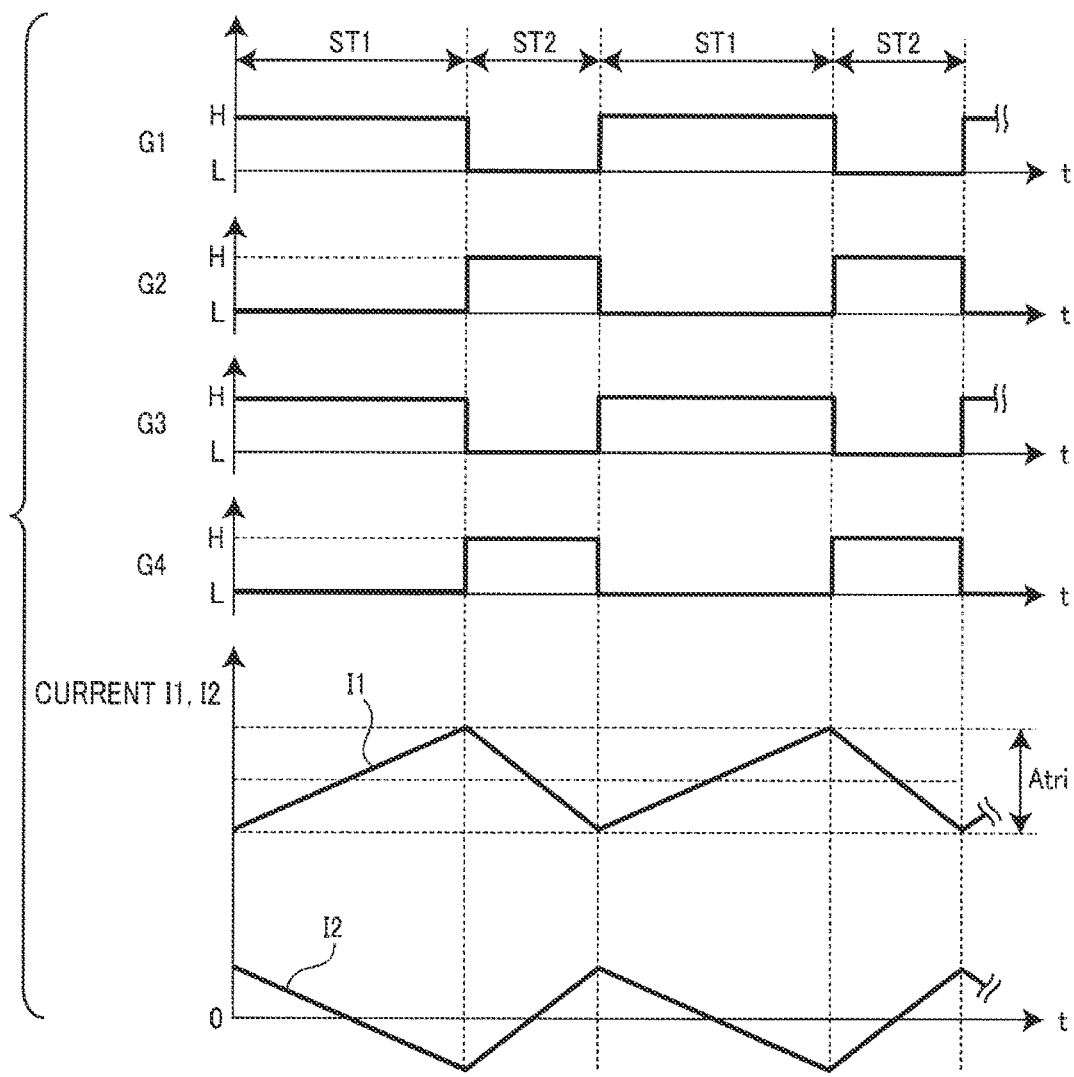
FIG. 3 is a timing chart showing a relationship between gate control signals G1 to G4 of FIG. 1A and current waveforms of currents I1 and I2 of inductors L1 and L2.

FIG. 3 is a timing chart showing a relationship between the gate control signals G1 to G4 of FIG. 1A and current waveforms of currents I1 and I2 of the inductors L1 and L2. Referring to FIG. 3, when the switch element S1 is turned on, the switch element S2 is turned off, and the switch element S3 is turned on (in the state ST1). When the switch element S1 is turned off, the switch element S2 is turned on, and the switch element S3 is turned off (in the state ST2). That is, the gate control signals G2 and G3 for the ripple cancellation current generator circuit 4 are generated in synchronization with the gate control signals G1 and G4 of the power converter circuit 1. In this case, when the applied voltage V1 higher than the input voltage Vin is applied to the capacitor C3 by using the power supply apparatus 12, as shown in FIG. 3, the current of the inductor L2 decreases in the state ST1, and the current of the inductor L2 increases in the state ST2.

The net current generated in the power converter circuit 1 is the sum of currents flowing through the inductor L1 and the inductor L2. That is, the triangular wave component of the current I1 flowing through the inductor L1 is canceled out by the current I2 (ripple cancellation current) flowing through the inductor L2.

Figure 4:
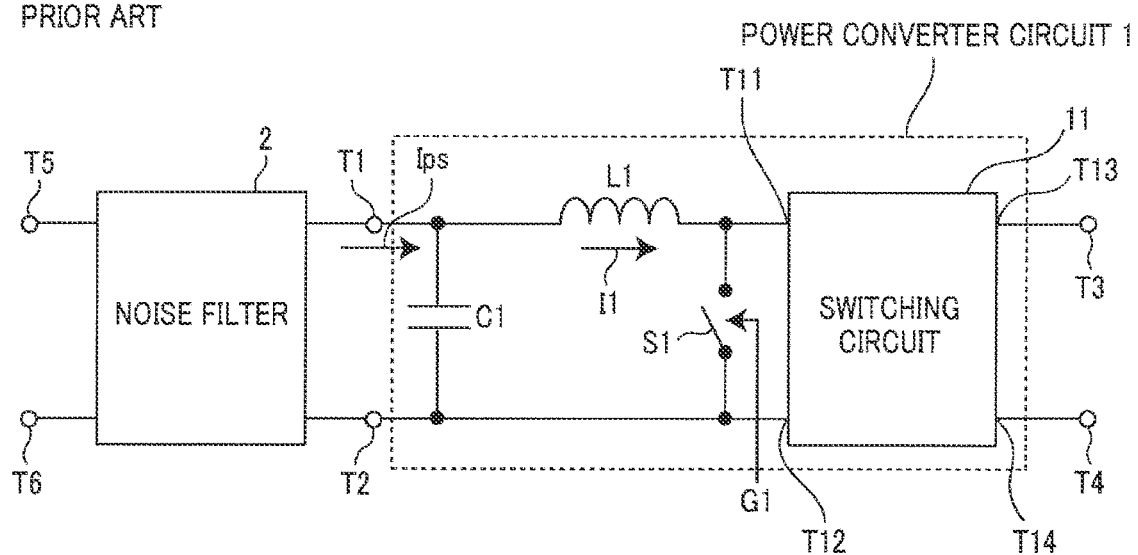
FIG. 4 is a block diagram showing a configuration example of a power converter apparatus according to a prior art.

FIG. 4 is a block diagram showing a configuration example of a power converter apparatus according to a prior art. In the power converter apparatus according to the prior art, as shown in FIG. 4, a noise filter 2 having input terminals T5 and T6 is used to suppress propagation of the ripple current Ips to the power supply. On the other hand, in the power converter apparatus according to the first embodiment, the noise filter 2 can be reduced.

Since the noise filter 2 is connected in series with the power converter circuit 1, a large current flows. Therefore, it is necessary to use a component having a large rated current, which causes an increase in size and an increase in cost. On the other hand, as shown in FIG. 3, only a small current corresponding to the triangular wave amplitude Atri flows through the inductor L2 and the switch elements S2 and S3 used in the first embodiment (no DC component flows). Therefore, components or parts having a small rated current can be used. This means not only that it can be implemented in a compact and low-cost manner, but also that the power losses in these components are small.

Further, since the ripple cancellation current generator circuit 4 is connected in parallel to the power converter circuit 1, the basic operation of the power converter circuit 1 is not affected. That is, the design for reducing the ripple current can be performed after the power converter circuit 1 is optimally designed from the viewpoint of power conversion efficiency and the like. In addition, it is fundamentally different from an approach of "detecting" noise and then trying to cancel out the noise, and the ripple current can be canceled out simply by driving in synchronization. This means that the suppression effect can be obtained even in a case where there is such a disturbance noise that may cause a detection error, and the present invention can also be applied to an apparatus having a strong safety requirement such as an in-vehicle device.

First Implementation Example of First Embodiment (Step-Up DC/DC Converter)

Figure 5:
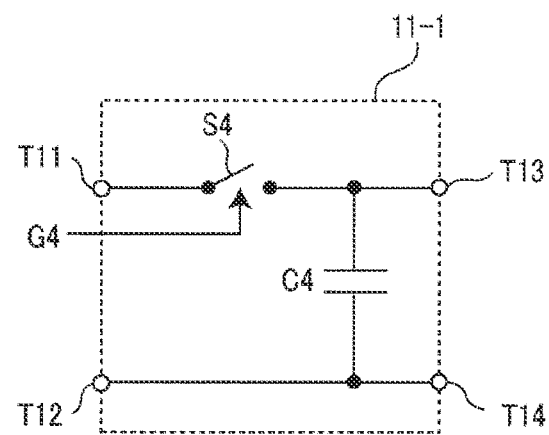
FIG. 5 is a circuit diagram showing a configuration example of a switching circuit 11-1 according to a first implementation example applied to the power converter apparatus of FIG. 1A.

FIG. 5 is a circuit diagram showing a configuration example of the switching circuit 11-1 according to a first implementation example applied to the power converter apparatus of FIG. 1A. Referring to FIG. 5, the switching circuit 11-1 includes a switch element S4 and a capacitor C4. The input terminal T11 is connected to the output terminal T13 via the switch element S4, and the input terminal T12 is connected to the output terminal T14. The capacitor C4 is connected in parallel to the output terminals T13 and T14.

As shown in FIG. 3, when the switch elements S1 and S4 are alternately turned on and off, the power converter circuit 1 operates as a step-up DC/DC converter. When the power converter circuit 1 is driven in the period T with the duty ratio of the gate control signal G1 for the switch element S1 as D and the duty ratio of the gate control signal G4 for the switch element S4 as (1-D), the triangular wave amplitude Atri shown in FIG. 3 is expressed by the following equation in the steady state.

$$Atri = DT \times (Vin/L1) \quad (1)$$

In this case, when $L2=a\times L1$ (where "a" is a predetermined positive coefficient), the equation (1) shows the condition under which the ripple current Ips of the inductor L1 can be completely canceled out. In order to completely cancel out the ripple current Ips, in FIG. 3, the triangular wave amplitudes Atri of the currents I1 and I2 flowing through the inductors L1 and L2 may be matched with each other. In the steady state, the triangular wave amplitude Atri of the inductor L2 is expressed by the following equation:

$$Atri=DT\times(V1-Vin)/(a\times L1) \quad (2)$$

Therefore, when the applied voltage V1 of the power supply apparatus 12 ($V1=(1+a)\times Vin$), the triangular wave amplitudes Atri of the currents flowing through the inductors L1 and L2 match each other, and the ripple current Ips is completely canceled out.

Although the above is the optimum condition, if the value of the applied voltage V1 of the power supply apparatus 12 is set to a value between $(1+0.5a)\times Vin$ and $(1+1.5a)\times Vin$, a noise reduction effect of 6 dB or more can be obtained. That is, the amplitude of the noise current is suppressed to half or less than the amplitude. Also in this case, by reducing the number of components of the noise filter 2, downsizing and cost reduction can be realized.

Next, with reference to FIG. 6, the effect of reducing the ripple current Ips by the circuit simulation will be described.

Referring to FIG. 1A, the inductances of the inductors L1 and L2 are $L1=L2=200$ µH. For example, all the switch elements S1 to S4 are constructed with MOS field-effect transistors, and the switching frequency of the switch elements S1 to S4 is set to 100 kHz (the period $T=1/100$ kHz=10 µs). In this case, the duty ratio D of the gate control signals G1 and G3 to the switch elements S1 and S3 is set to $D=0.7$. When the input voltage Vin is 100 V, the applied voltage V1 of the power supply apparatus 12 is calculated to be 200 V. Therefore, a voltage of 200 V is applied from the power supply apparatus 12 to the capacitor C3.

Figure 6:
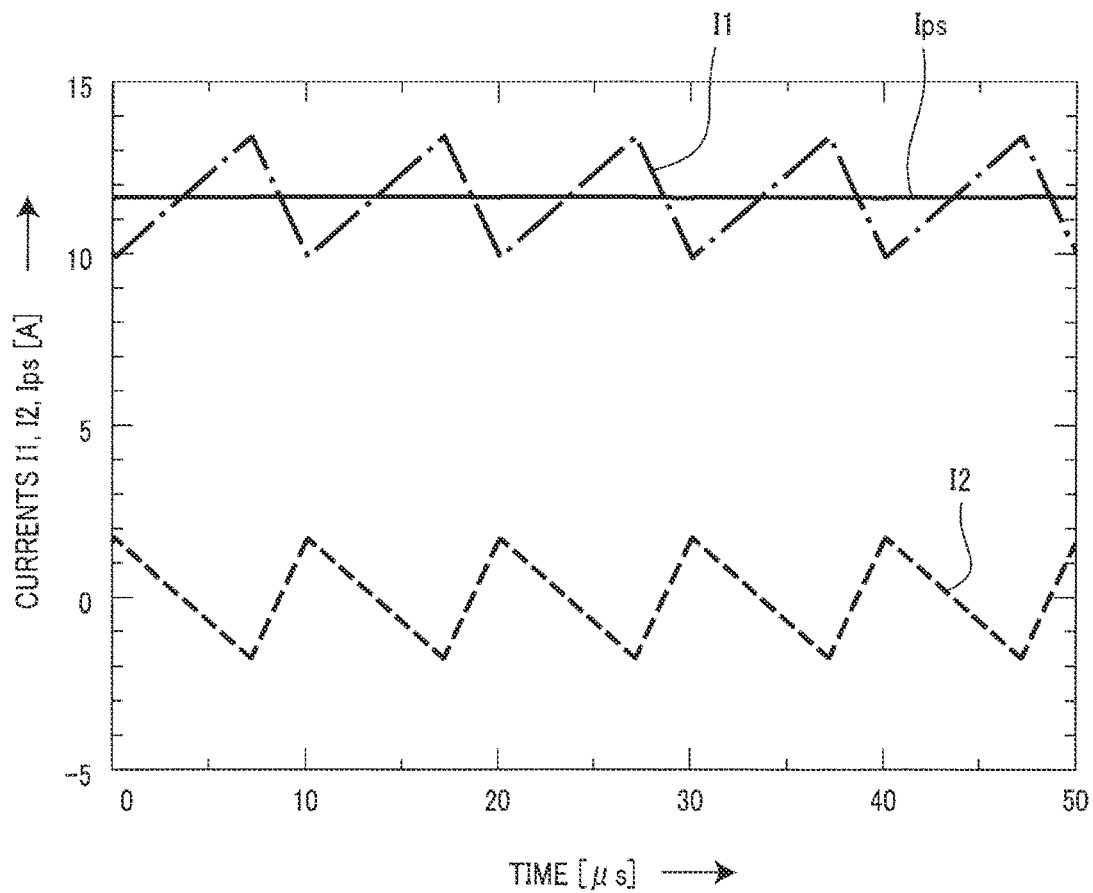
FIG. 6 is a diagram showing a simulation result in the power converter apparatus using the switching circuit 11-1 of FIG. 5, and is a timing chart showing the currents I1 and I2 of the inductors L1 and L2 and the power supply inflow current Ips.

FIG. 6 is a diagram showing a simulation result in the power converter apparatus using the switching circuit 11-1 of FIG. 5, and is a timing chart showing the currents I1 and I2 of inductors L1 and L2 and the power supply inflow current Ips. As is apparent from FIG. 6, the triangular wave component included in the current of the inductor L1 is canceled out by the current I2 of the inductor L2. As a result, it can be confirmed that the power supply inflow current Ips propagating from the input terminal T1 to the power supply does not include any ripple component.

It is noted that the same effect before the switching of the timings can be obtained even if the on and off timings of the switch elements S2 and S3 are switched and it is set that $V1=Vin\times\{1-(1+a)D\}/(1-D)$.

As described above, for example, a MOS field effect transistor or a transistor such as a GaN-HEMT (High Electron Mobility Transistor) may be used as the switch elements S1 to S4. In addition, a diode may be used as the switch element S4, and in this case, the gate control signal G4 is unnecessary.

Power Factor Correction Circuit

In addition, for example, a full-bridge diode rectifier circuit may be connected to a preceding stage of the input terminals T1 and T2 to configure the full-bridge diode rectifier circuit as a power factor correction circuit. In this case, since the AC voltage is inputted to the input terminal of the power factor correction circuit and the input voltage Vin to the power converter circuit 1 fluctuates, the applied voltage V1 of the power supply apparatus 12 may be fluctuated accordingly. At this time, reducing the noise filter 2 also results in an effect of improving the power factor.

Second Implementation Example (SEPIC) of First Embodiment

Figure 7:
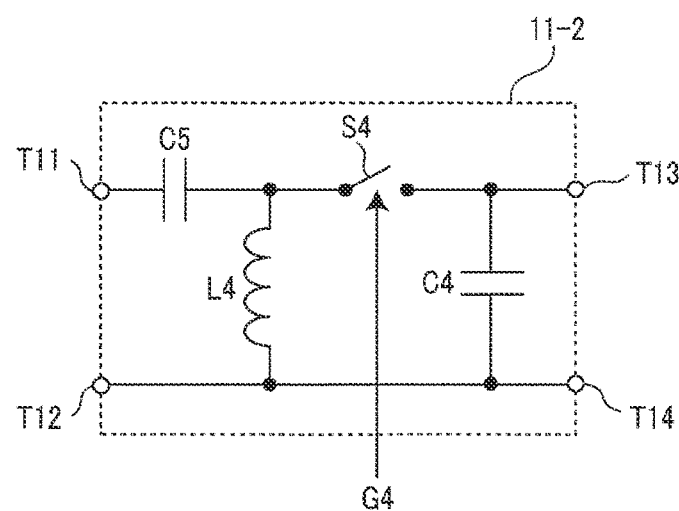
FIG. 7 is a circuit diagram showing a configuration example of a switching circuit 11-2 according to a second implementation example applied to the power converter apparatus of FIG. 1A.

FIG. 7 is a circuit diagram showing a configuration example of the switching circuit 11-2 according to a second implementation example applied to the power converter apparatus of FIG. 1A. Referring to FIG. 7, the switching circuit 11-2 includes the switch element S4, the capacitors C4 and C5, and the inductor L4. The input terminal T11 is connected to the output terminal T13 via the capacitor C5 and the switch element S4, and the input terminal T12 is connected to an output terminal T14. The capacitor C4 is connected in parallel to the output terminals T13 and T14. In addition, the inductor L4 is connected between the connection point between the capacitor C5 and the switch element S4 and the input terminal T12.

Referring to FIG. 3, when the switch elements S1 and S4 are alternately turned on and off, the power converter circuit 1 operates as SEPIC (Single Ended Primary Inductor Converter; step-up/down DC/DC converter). When the power converter circuit 1 is driven in the period T with the duty ratio of the gate control signal G1 for the switch element S1 as D and the duty ratio of the gate control signal G4 for the switch element S4 as (1-D), the triangular wave amplitude Atri shown in FIG. 3 is expressed by the following equation in the steady state.

$$Atri=DT\times(Vin/L1) \quad (3)$$

The ripple current Ips can be canceled out in a manner similar to that of the case of the step-up DC/DC converter according to the first implementation example of the first embodiment.

Second Embodiment

Figure 8:
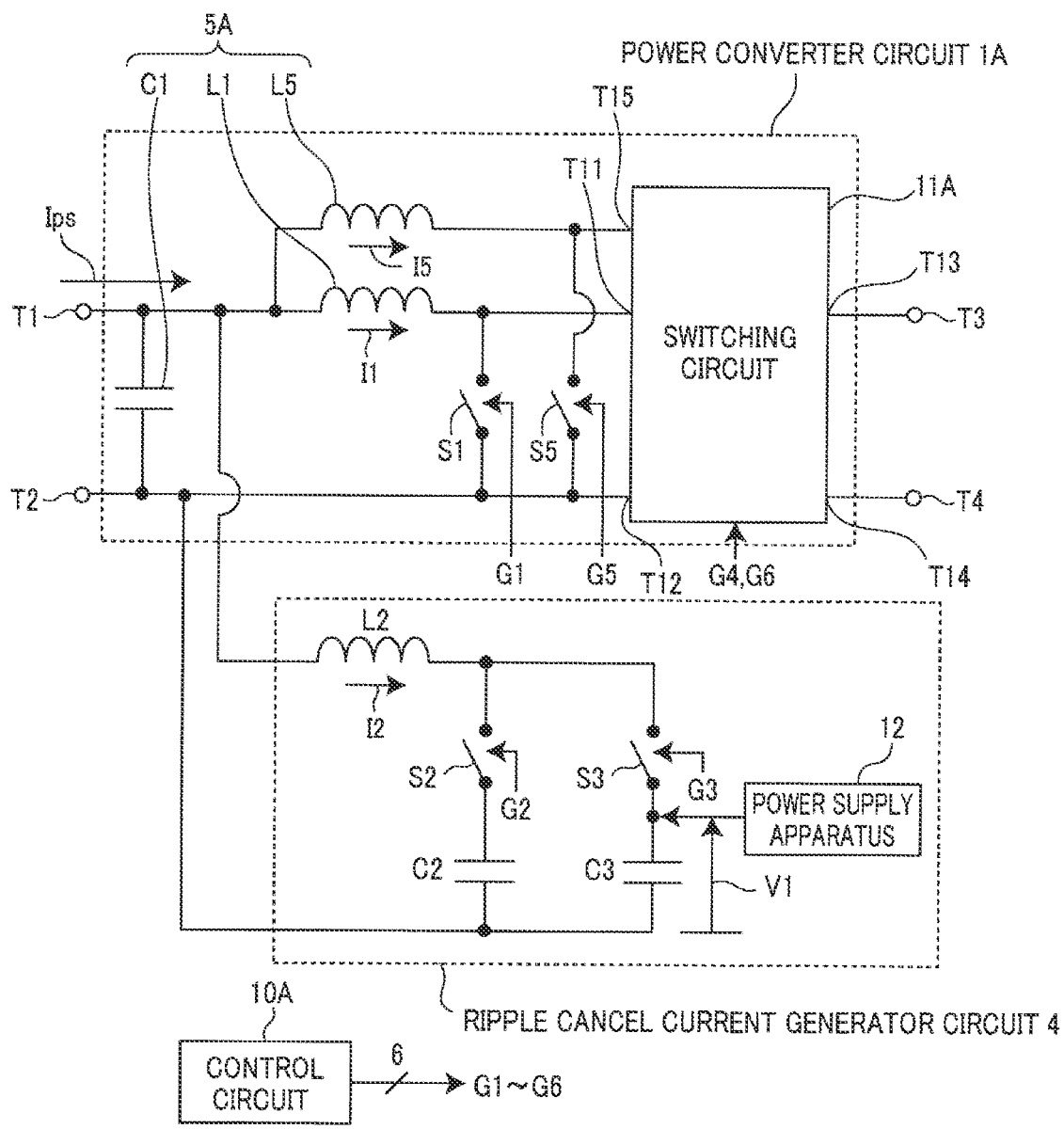
FIG. 8 is a block diagram showing a configuration example of a power converter apparatus according to a second embodiment.

FIG. 8 is a block diagram showing a configuration example of a power converter apparatus according to a second embodiment. Referring to FIG. 8, the power converter apparatus according to the second embodiment has the following differences as compared with the power converter apparatus according to the first embodiment in FIG. 1.

(1) A power converter circuit 1A is provided instead of the power converter circuit 1.
(2) A smoothing circuit 5A is provided instead of the smoothing circuit 5. The smoothing circuit 5A further includes an inductor L5 that is a reactor in the smoothing circuit 5.
(3) The power converter circuit 1A further includes a switch element S5 that is controlled to be turned on and off by a gate control signal G5 as compared with the power converter circuit 1.
(4) Instead of the switching circuit 11, an input terminal T15 is further provided, and a switching circuit 11A controlled to be turned on and off by gate control signals G4 and G6 is provided.
(5) A control circuit 10A is provided instead of the control circuit 10. The control circuit 10A generates gate control signals G1 to G6.

Hereinafter, the differences will be described.

Referring to FIG. 8, the input terminal T1 is connected to the input terminal T15 of the switching circuit 11A via the inductor L5 of a reactor, and the input terminal T15 is connected to the input terminal T12 via the switch element S5. In this case, the power converter circuit 1A configures a two-phase interleave circuit that drives the switch elements S1 and S5 shifted by half the period (T/2).

Figure 9:
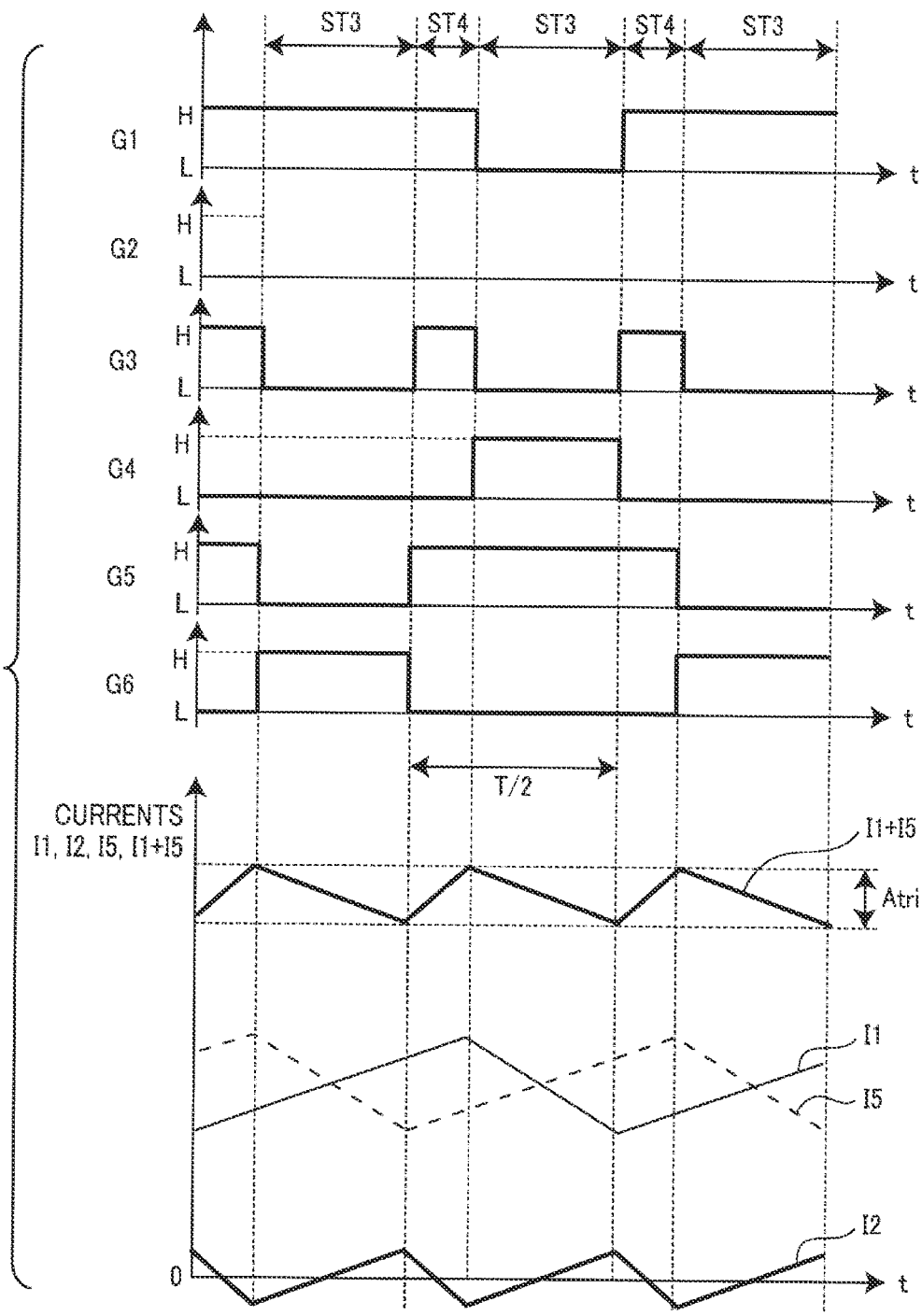
FIG. 9 is a timing chart showing a relationship between gate control signals G1 to G6 of FIG. 8 and current waveforms of currents I1, I2, and I5 and a current (I1+I5) of inductors L1, L2, and L5.

FIG. 9 is a timing chart showing a relationship between the gate control signals G1 to G6 of FIG. 8 and current waveforms of currents I1, I2, and I5 and a current (I1+I5) of the inductors L1, L2, and L5. FIG. 9 shows current waveforms when the duty ratios of the gate control signals G1 and G5 to the switch elements S1 and S5 are larger than 0.5. Referring to FIG. 9, in the state ST3, one of the switch elements S1 and S5 is turned on, and the other is turned off. In the state ST4, both the switch elements S1 and S5 are turned on. At this time, the input current of the power converter circuit 1A is the sum (I1+I5) of the currents flowing through the inductors L1 and L5. That is, the gate control signals G2 and G3 for the ripple cancellation current generator circuit 4 are generated in synchronization with the gate control signals G1 and G4 to G6 of the power converter circuit 1.

In the power converter apparatus of FIG. 8, as shown in FIG. 9, the switch element S2 is turned on and the switch element S3 is turned off in the state ST3. In the state ST4, the switch element S2 is turned off, and the switch element S3 is turned on. When the applied voltage V1 higher than the input voltage Vin is applied to the capacitor C3 by using the power supply apparatus 12, as shown in FIG. 9, the current I2 of the inductor L2 increases in the state ST3, and the current I2 of the inductor L2 decreases in the state ST4.

The net current generated in the power converter apparatus of FIG. 8 is the sum (I1+I2+I5) of the currents flowing through the inductors L1, L5, and L2. That is, the triangular wave component included in the sum (I1+I5) of the currents flowing through the inductors L1 and L5 is canceled by the current I2 flowing through the inductor L2. As a result, the noise filter 2 can be reduced in a manner similar to that of the first embodiment.

Interleaved Step-Up Dc/Dc Converter

Figure 10:
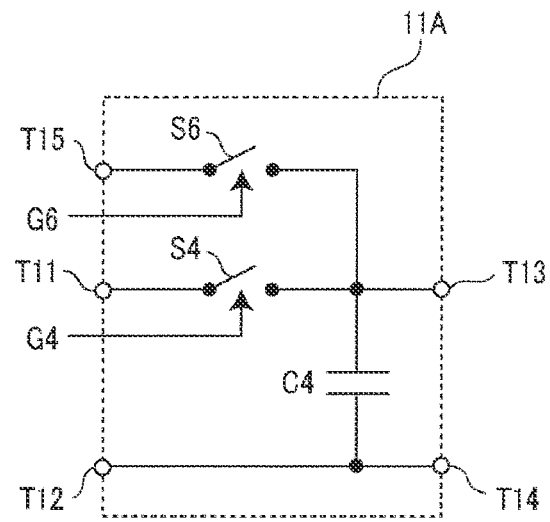
FIG. 10 is a circuit diagram showing a configuration example of a switching circuit 11A in FIG. 8.

FIG. 10 is a circuit diagram showing a configuration example of the switching circuit 11A of FIG. 8 configuring an interleaved step-up DC/DC converter.

The switching circuit 11A of FIG. 10 has the following differences from the switching circuit 11-1 of FIG. 5.

(1) The input terminal T15 and a switch element S6 are further provided.
(2) The input terminal T15 is connected to the output terminal T13 via the switch element S6 that is controlled to be turned on and off by the gate control signal G6.

In the power converter apparatus of FIG. 8 including the switching circuit 11A configured as described above, as shown in FIG. 9, when the switch elements S1 and S4 are alternately turned on and off, the switch elements S5 and S6 are alternately turned on and off, and the switch elements S1 and S5 are shifted by half the period (T/2) and driven, the power converter circuit 1A operates as an interleaved step-up DC/DC converter. When the power converter circuit 1A is driven in the period T with the duty ratios of the gate control signals G1 and G5 for the switch elements S1 and S5 as D and the duty ratios of the gate control signals G4 and G6 for the switch elements S4 and S6 as (1-D), the triangular wave amplitude Atri shown in FIG. 9 is expressed by the following equation in the steady state.

$$Atri = (2D-1)T \times (Vin/L1) \quad (4)$$

In this case, when the inductances of the inductors are L5=L1 and L2=a×L1, conditions under which the triangular wave components included in the sum of the currents flowing through the inductors L1 and L5 can be completely canceled out will be described below. In order to completely cancel out the ripple current, in FIG. 9, the sum (I1+I5) of the currents flowing through the inductors L1 and L5 may match the triangular wave amplitude Atri of the current I2 flowing through the inductor L2. In the steady state, the triangular wave amplitude Atri of the inductor L2 is expressed by the following equation:

$$Atri = (D-0.5)T \times (V1-Vin)/(a \times L1) \quad (5)$$

Therefore, when the applied voltage V1=(1+2a)×Vin (where the coefficient a is a positive integer), the sum (I1+I5) of the currents flowing through the inductors L1 and L5 matches the triangular wave amplitude Atri of the current I2 flowing through the inductor L2, and the ripple current is completely canceled out.

Although the above is the optimum condition, if the value of the applied voltage V1 of the power supply apparatus 12 is set to a value between (1+a)×Vin and (1+3a)×Vin, a noise reduction effect of 6 dB or more can be obtained, that is, the amplitude of the noise current is suppressed to half or less than the amplitude. Also in this case, by reducing the number of components of the noise filter 2, downsizing and cost reduction can be realized.

Figure 11:
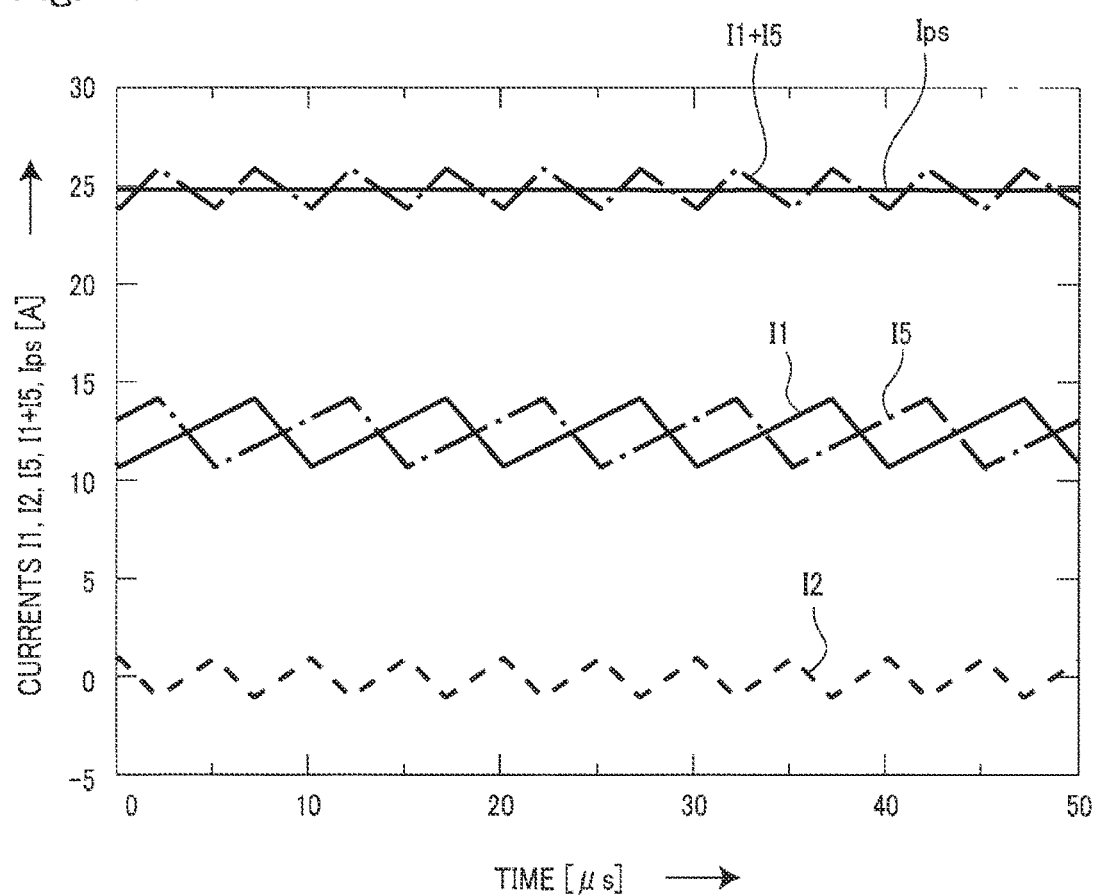
FIG. 11 is a diagram showing a simulation result of the power converter apparatus of FIG. 8, and is a timing chart showing current waveforms of the currents I1, I2, and I5 and the current (I1+I5) of the inductors L1, L2, and L5 and the power supply inflow current Ips.

FIG. 11 is a diagram showing a simulation result of the power converter apparatus of FIG. 8, and is a timing chart showing current waveforms of the currents I1, I2, and I5 and the current (I1+I5) of the inductors L1, L2, and L5 and the power supply inflow current Ips. FIG. 11 shows the effect of reducing the ripple current by the circuit simulation.

In FIG. 8, the inductance of the inductor is L1=L5=L2=200 μH. It is assumed that all the switch elements S1 to S6 are configured by MOS field-effect transistors. In addition, the switching frequencies of the switch elements S1 and S4 to S6 is set to 100 kHz, that is, the period T=1/100 kHz=10 μs. Further, the switching frequencies of the switch elements S2 and S3 are set to 200 kHz, and the duty ratios D of the gate control signals G1 and G5 to the switch elements S1 and S5 are set to 0.7. In this case, when the input voltage Vin=100 V, the applied voltage V1 of the power supply apparatus 12 is calculated to be V1=300 V, and thus, the voltage V1=300 V is applied from the power supply apparatus 12 to the capacitor C3. A current waveform of each part at this time is shown in FIG. 11.

As is apparent from FIG. 11, the current I1 of the inductor L1 and the current I5 of the inductor L5 include a triangular wave component of 100 kHz, and are shifted from each other by half the period of 5 μs. Therefore, the sum (I1+I5) of the currents of the inductors L1 and L5 includes a triangular wave component having a frequency of 200 kHz that is twice the frequency of the triangular wave component. This is canceled out by the current I2 of the inductor L2. As a result, it can be confirmed that the current Ips propagating from the input terminal T1 to the power supply does not include the ripple component of the triangular wave.

It is noted that, in FIG. 10, the same effect can be obtained by switching on and off the timings of the switch elements S2 and S3 to the following equation:

$$V1 = Vin \times \{1 - a \times (2D-1)/(1-D)\}.$$

It is noted that the inductors L1 and L5 may be magnetically coupled to each other. In this case, the inductors L1 and L5 can be implemented as one coupled inductor. In addition, the power converter circuit 1 may be configured as an interleave circuit of three or more phases.

In addition, in the interleave circuit, in order to improve power conversion efficiency, only a single phase may be operated at the time of light load. In this case, the control of the switch elements S2 and S3 and the applied voltage V1 of the power supply apparatus 12 may be switched according to the operation method. That is, the operation may be performed according to the second embodiment during the interleaving operation, and the operation may be performed according to the first embodiment during the single-phase operation. As a result, the noise can be suppressed regardless of the operation method of the interleave circuit.

Third Embodiment

Figure 12:
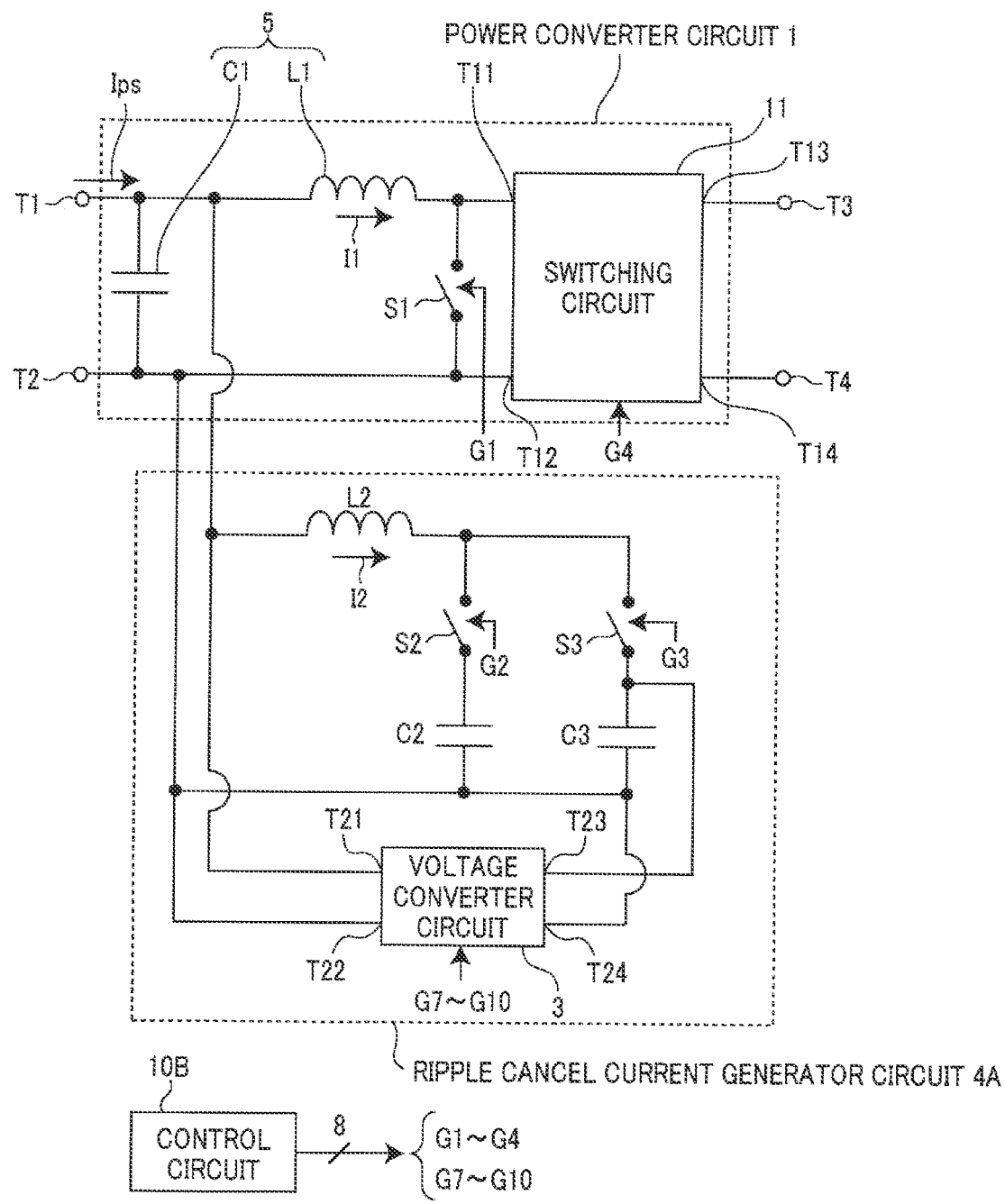
FIG. 12 is a block diagram showing a configuration example of a power converter apparatus according to a third embodiment.

FIG. 12 is a block diagram showing a configuration example of a power converter apparatus according to a third embodiment. Referring to FIG. 12, the power converter apparatus according to the third embodiment has the following differences as compared with the power converter apparatus according to the first embodiment of FIG. 1.
(1) Instead of the ripple cancellation current generator circuit 4, a ripple cancellation current generator circuit 4A is provided.
(2) The ripple cancellation current generator circuit 4A includes a voltage converter circuit 3 instead of the power supply apparatus 12. In this case, the voltage converter circuit 3 is an example of a power supply apparatus.
(3) Instead of the control circuit 10, a control circuit 10B is provided. The control circuit 10B generates gate control signals G1 to G4 and G7 to G10.

Hereinafter, the differences will be described.

Referring to FIG. 12, the voltage converter circuit 3 includes input terminals T21 and T22 and output terminals T23 and T24, converts the input voltage Vin into the applied voltage V1, and applies the applied voltage V1 to a capacitor C3. As described in the first embodiment, in the case of the applied voltage V1=(1+a)×Vin, the ripple current is completely canceled out. If the power converter apparatus of FIG. 12 according to the third embodiment is used, since the input voltage of the voltage converter circuit 3 is Vin, the voltage converter circuit 3 may perform power conversion with the step-up ratio (1+a) regardless of the state of the power converter circuit 1 (the driving period and the duty ratio of each switch element). Therefore, it is not necessary to achieve synchronization with the power converter circuit 1, and the applied voltage V1 can be easily generated from the viewpoint of design.

Figure 13:
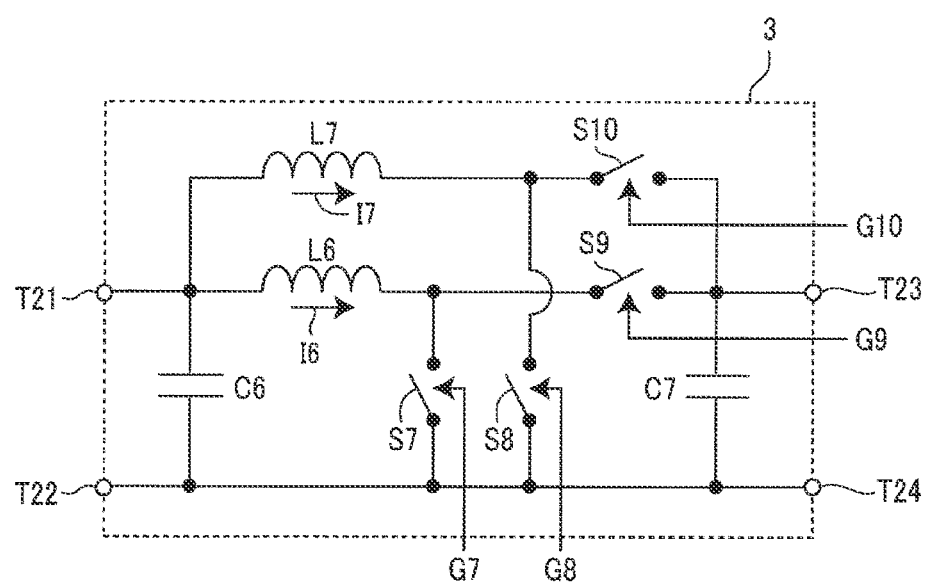
FIG. 13 is a circuit diagram showing a configuration example of a voltage converter circuit 3 of FIG. 12.

FIG. 13 is a circuit diagram showing a configuration example of the voltage converter circuit 3 of FIG. 12. Referring to FIG. 13, the voltage converter circuit 3 includes capacitors C6 and C7, inductors L6 and L7, and switch elements S7 to S10. In this case, the switch elements S7 to S10 are controlled to be turned on and off by the gate control signals G7 to G10 from the control circuit 10B, respectively.

Referring to FIG. 13, the capacitor C6 is connected in parallel between the input terminal T21 and the input terminal T22, and the capacitor C7 is connected in parallel between the output terminals T23 and T24. The input terminal T21 is connected to the input terminal T22 and the output terminal T24 via the inductor L6 and the switch element S7, and is connected to the output terminal T23 via the inductor L6 and the switch element S9. In addition, the input terminal T21 is connected to the output terminal T24 via the inductor L7 and the switch element S8, and is connected to the output terminal T23 via the inductor L7 and the switch element S10.

In the voltage converter circuit 3 of FIG. 13 configured as described above, the inductance of the inductor is L1=L2. At this time, since the positive coefficient a=1, this leads to the applied voltage V1=2Vin. Therefore, the voltage converter circuit 3 in FIG. 13 configures an interleaved step-up DC/DC converter.

Figure 14A:
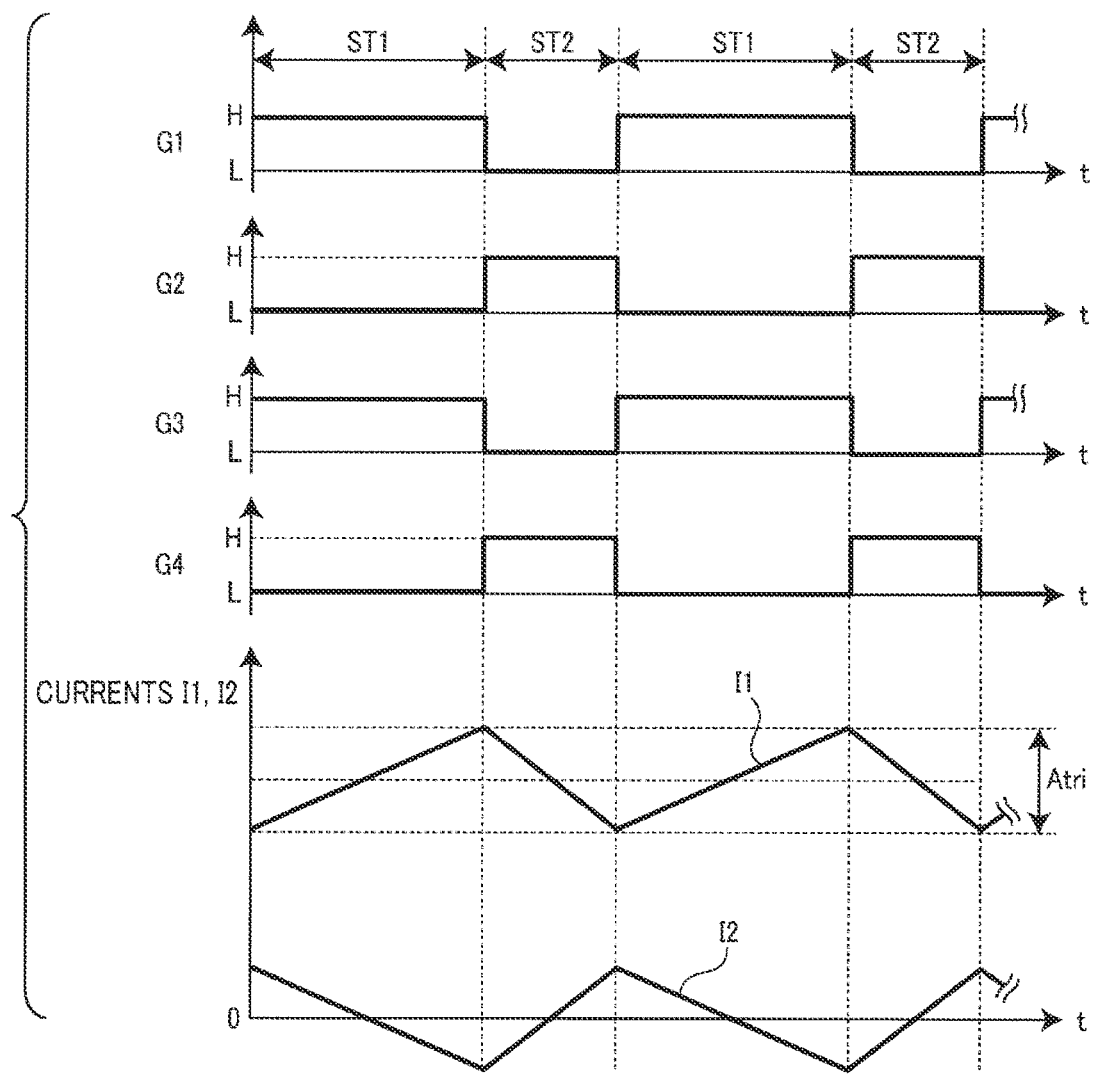
FIG. 14A is a timing chart showing a relationship between the gate control signals G1 to G4 in FIG. 12 and the currents I1 and I2 of the inductors L1 and L2.
Figure 14B:
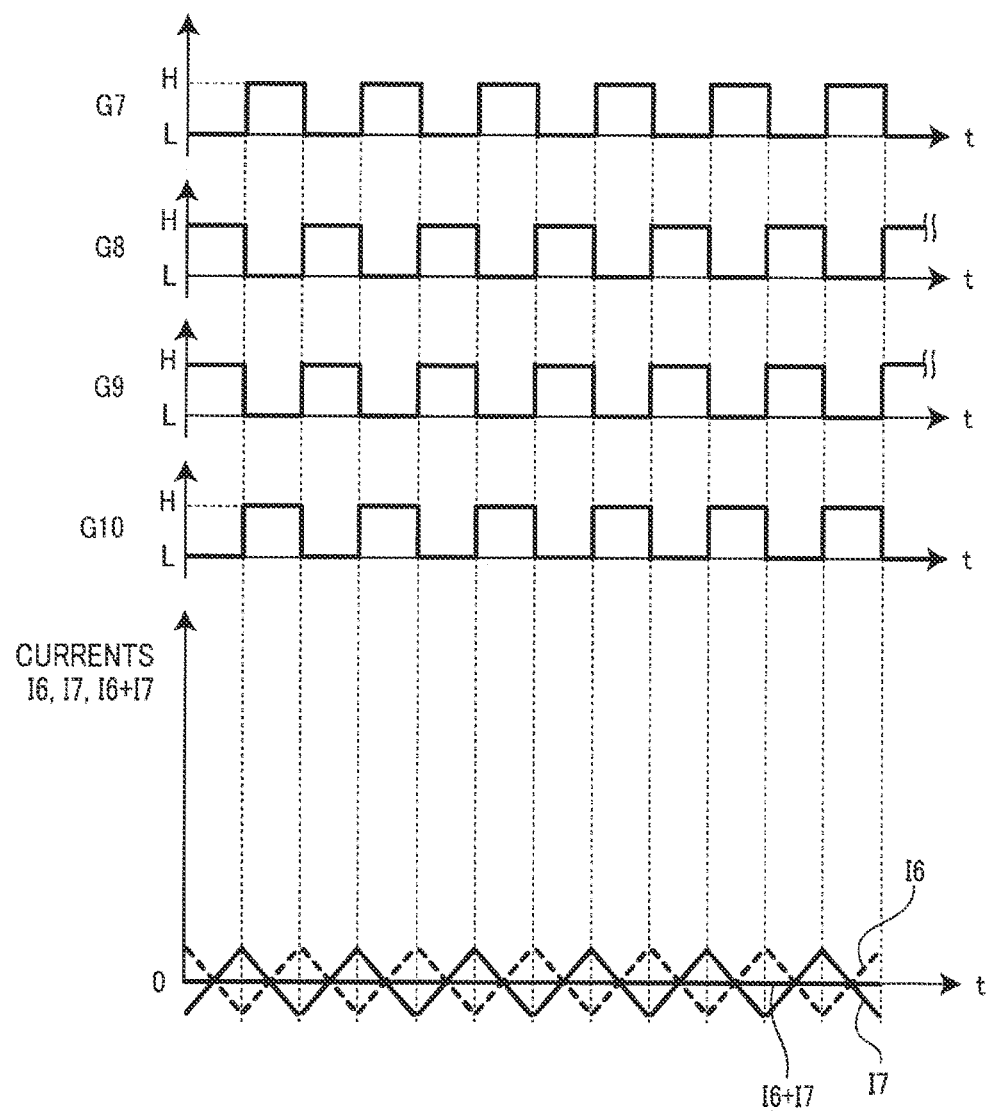
FIG. 14B is a timing chart showing a relationship between gate control signals G7 to G10 in FIG. 12 and currents I6 and I7 and a current (I6+I7) of inductors L6 and L7.

FIG. 14A is a timing chart showing a relationship between the gate control signals G1 to G4 in FIG. 12 and currents I1 and I2 of the inductors L1 and L2. FIG. 14B is a timing chart showing a relationship between the gate control signals G7 to G10 in FIG. 12 and the currents I6 and I7 and a current (I6+I7) of the inductors L6 and L7.

As described above, since the voltage converter circuit 3 in FIG. 13 is an interleaved step-up DC/DC converter, in order to set the step-up ratio to 2, as shown in FIG. 14, the switch elements S7 and S8 may be driven with the duty ratios of the gate control signals G7 and G8 to the switch elements S7 and S8 set to 0.5. In the case of the duty ratio of 0.5, the triangular wave currents flowing through the inductors L6 and L7 do not include any even-order harmonic components. Therefore, when the switch elements S7 and S8 are shifted by half the period and driven (interleave operation), the odd-order components are also canceled out, and ripples do not occur in the input current from the voltage converter circuit 3. That is, the ripple component of the input current of the power converter circuit 1 is canceled out by the triangular wave current of the inductor L2, and the voltage converter circuit 3 does not generate the ripple current, so that the ripple current does not propagate through terminals T1 and T2. The cancellation of the triangular wave currents of the inductors L1 and L2 is completed by the operations of the switch elements S1 to S4. The cancellation of the triangular wave currents of the inductors L6 and L7 is completed by the operations of the switch elements S7 to S10.

Therefore, the gate control signals G1 to G4 in FIG. 14A and the gate control signals G7 to G10 in FIG. 14B do not need to be synchronized with each other including the driving frequency and the timing, and can be operated asynchronously. However, referring to FIG. 14A, in a manner similar to that of the first and second embodiments, the gate control signals G2 and G3 for the ripple cancellation current generator circuit 4A are generated in synchronization with the gate control signals G1 and G4 of the power converter circuit 1.

In addition, a dedicated noise filter may be provided in a preceding stage of the input terminals T21 and T22 of the voltage converter circuit 3 to suppress noise generated by the voltage converter circuit 3. Since any large current does not flow in the voltage converter circuit 3, the noise filter can be mounted in a small size and at low cost. For the same reason, the voltage converter circuit 3 itself can also be mounted in a small size and at low cost.

Fourth Embodiment

Figure 15:
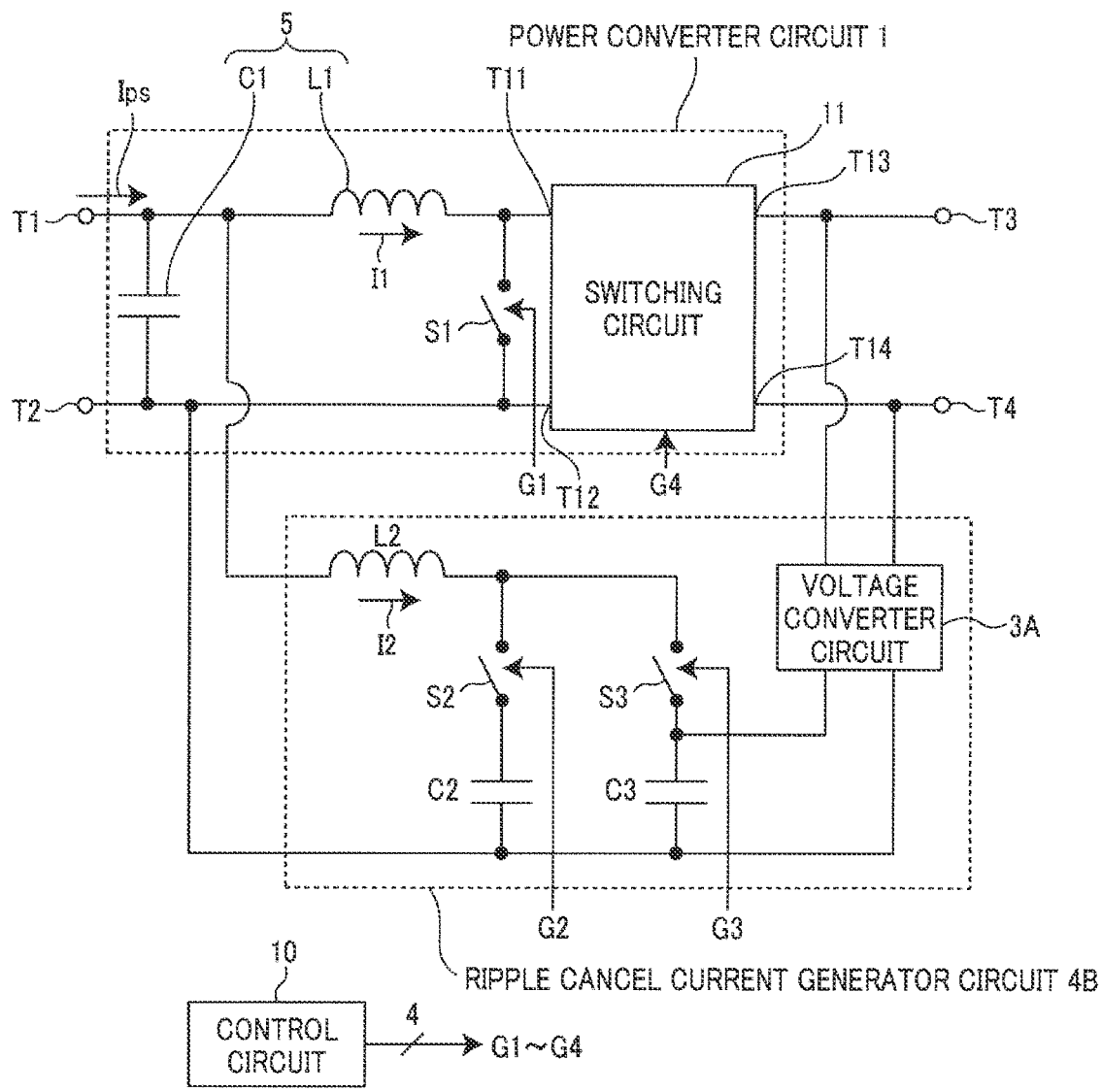
FIG. 15 is a block diagram showing a configuration example of a power converter apparatus according to a fourth embodiment.

FIG. 15 is a block diagram showing a configuration example of a power converter apparatus according to a fourth embodiment. Referring to FIG. 15, the power converter apparatus according to the fourth embodiment has the following differences as compared with the power converter apparatus according to the first embodiment of FIG. 1.
(1) Instead of the ripple cancellation current generator circuit 4, a ripple cancellation current generator circuit 4B is provided.
(2) The ripple cancellation current generator circuit 4B includes a voltage converter circuit 3A instead of the power supply apparatus 12. In this case, the voltage converter circuit 3A is an example of a power supply apparatus.

Hereinafter, the differences will be described.

Referring to FIG. 15, the voltage converter circuit 3A converts the output voltage Vout of the power converter circuit 1 into the applied voltage V1, and applies the applied voltage V1 to the capacitor C3. An advantage of the present embodiment is that since the voltage converter circuit 3A is not directly connected to the input terminals T1 and T2, the ripple current generated by the voltage converter circuit 3A does not propagate to the input terminals T1 and T2. That is, the applied voltage V1 can be easily generated from the viewpoint of countermeasures against noise. Therefore, the present invention can be implemented by using any general DC/DC converter circuit, and may be operated by using general control so that the output voltage of the DC/DC converter becomes the voltage V1.

On the other hand, unlike the third embodiment, the step-up/down ratio required for the voltage converter circuit 3A depends on the duty ratio of the switch element S1. Therefore, it is necessary to configure the voltage converter circuit 3A so that the step-up/down ratio can be changed in accordance with the duty ratio of the gate control signal G1 to the switch element S1.

As described above, according to the present embodiment, the ripple current generated by the voltage converter circuit 3A does not propagate to the input terminals T1 and T2 while the present embodiment has the same function and effect as those of the first to third embodiments. Therefore, there is a unique effect that the applied voltage V1 can be easily generated from the viewpoint of countermeasures against noise.

Fifth Embodiment

Figure 16:
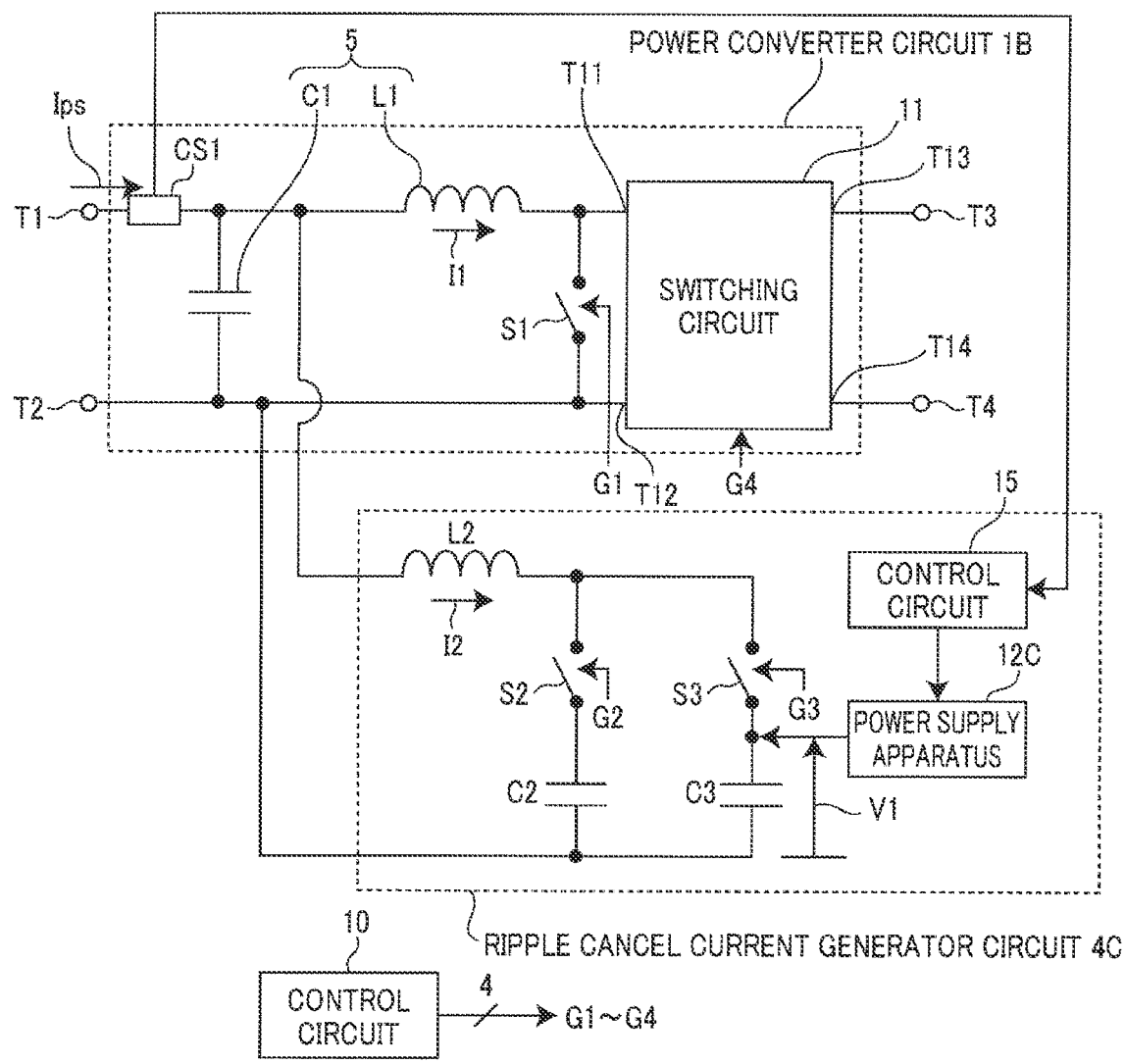
FIG. 16 is a block diagram showing a configuration example of a power converter apparatus according to a fifth embodiment.

FIG. 16 is a block diagram showing a configuration example of a power converter apparatus according to a fifth embodiment. Referring to FIG. 16, the power converter apparatus according to the fifth embodiment has the following differences as compared with the power converter apparatus according to the first embodiment of FIG. 1.

(1) A power converter circuit 1B is provided instead of the power converter circuit 1. The power converter circuit 1B includes a current detector CS1 between the input terminal T1 and the capacitor C1.

(2) Instead of the ripple cancellation current generator circuit 4, a ripple cancellation current generator circuit 4C is provided. The ripple cancellation current generator circuit 4C includes a power supply apparatus 12C instead of the power supply apparatus 12, and further includes a control circuit 15. In this case, the power supply apparatus 12C includes, for example, a DC/DC converter including a switching circuit including a gate driver.

Hereinafter, the differences will be described.

Referring to FIG. 16, the current detector CS1 detects a current propagating to the input terminal T1 and outputs a current detection signal to the control circuit 15.

Figure 17:
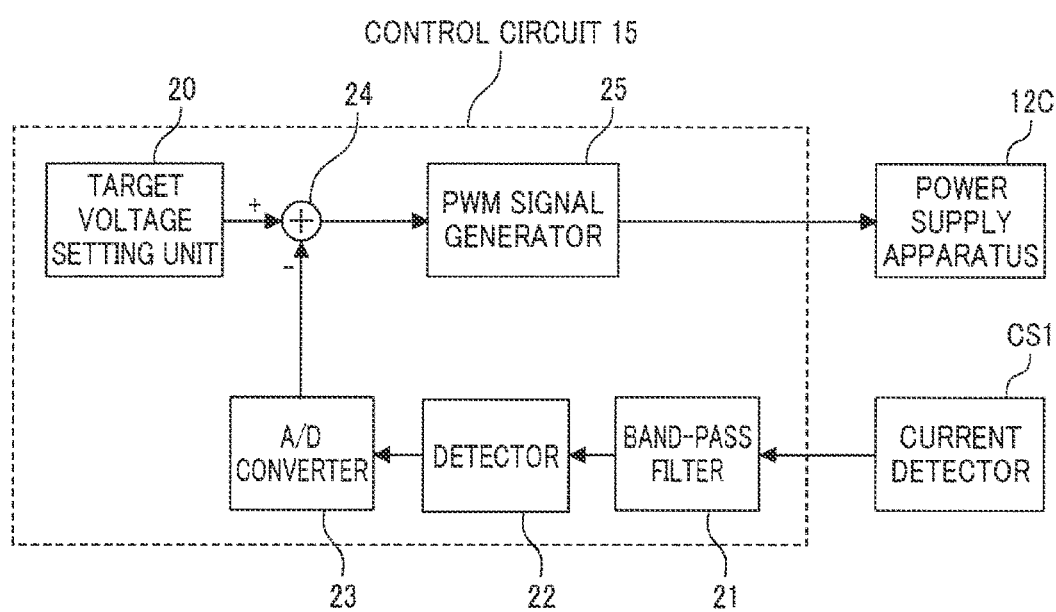
FIG. 17 is a block diagram showing a configuration example of a control circuit 15 of FIG. 16.

FIG. 17 is a block diagram showing a configuration example of the control circuit 15 of FIG. 16. Referring to FIG. 17, the control circuit 15 includes a target voltage setting unit 20, a band-pass filter 21, a detector 22, an A/D converter 23, a subtractor 24, and a PWM signal generator 25. In this case, the control circuit 15 performs control to correct the applied voltage V1 of the power supply apparatus 12C so as to minimize the ripple current based on the current detection signal corresponding to the current detected by the current detector CS1.

Referring to FIG. 17, a noise detection signal corresponding to a noise level is detected by passing the current detection signal from the current detector CS1 through the band-pass filter 21 and the detector 22, and the noise detection signal is converted into a digital signal by the A/D converter and then output to the subtractor 24. The subtractor 24 subtracts the digital signal of the noise detection signal from the target voltage signal from the target voltage setting unit 20 and outputs a signal of a subtraction result to the PWM signal generator 25, and the PWM signal generator 25 generates a PWM signal (gate control signal) having a duty ratio corresponding to the signal of the subtraction result and applies the PWM signal to the gate driver of the switching circuit of the power supply apparatus 12C.

The control circuit 15 configured as described above executes feedback control for adjusting the duty ratio of the PWM signal (gate control signal) that generates the applied voltage V1 of the power supply apparatus 12C from the comparison between the noise detection signal and the target voltage. As a result, even when the inductance values of inductors L1 and L2 are different from expected values due to component variations, the ripple component of the input current can be sufficiently suppressed.

INDUSTRIAL APPLICABILITY

The power converter apparatus according to the present disclosure is useful for realizing a power converter apparatus used in an in-vehicle device, an industrial device, or the like with low noise, small size, and low cost.

The invention claimed is:
1. A power converter apparatus comprising:
a pair of input terminals;
a pair of output terminals; and
a power converter circuit including a first series circuit of a first inductor and a first switch element connected in parallel to the pair of input terminals, and a switching circuit being configured to switch and output a voltage between both ends of the first switch element by using a second switch element,
wherein the power converter circuit is configured to perform power conversion of an input voltage inputted to the pair of input terminals into a predetermined output voltage and then output the predetermined output voltage to the pair of output terminals,
wherein the power converter apparatus comprises a ripple cancellation current generator circuit being configured to, in case of the first switch element being controlled to be turned on and off, generate a ripple cancellation current that cancels out a ripple current generated by accumulation and release of current energy in the first inductor and inputs the ripple cancellation current to a pair of input terminals of the power converter apparatus to cancel out the ripple current, and
wherein the ripple cancellation current generator circuit comprises:
a second inductor having one end connected to one of the pair of input terminals;
a second series circuit connected between another end of the second inductor and the other of the pair of input terminals, the second series circuit being configured by connecting a third switch element and a first capacitor in series;

a third series circuit connected in parallel to the second series circuit, the third series circuit being configured by connecting a fourth switch element and a second capacitor in series; and a power supply apparatus being configured to apply a predetermined applied voltage to the second capacitor.

2. The power converter apparatus as claimed in claim 1, further comprising a first control circuit being configured to generate a pair of second gate control signals for driving the third and fourth switch elements in an inverted relationship with each other in synchronization with a pair of first gate control signals supplied to the first and second switch elements.

3. The power converter apparatus as claimed in claim 1, wherein in case of $L2=a \times L1$, the applied voltage $V1$ is set to a value between $(1+0.5a) \times Vin$ and $(1+1.5a) \times Vin$, where the input voltage is Vin, an inductance of the first inductor is L1, an inductance of the second inductor is L2, and a positive coefficient is "a".

4. The power converter apparatus as claimed in claim 1, wherein in case of $L2=a \times L1$, the applied voltage $V1$ is set to a value of $V1=(1+a) \times Vin$, where the input voltage is Vin, an inductance of the first inductor is L1, an inductance of the second inductor is L2, and a positive coefficient is "a".

5. The power converter apparatus as claimed in claim 1, wherein the power converter circuit is a step-up DC/DC converter.

6. The power converter apparatus as claimed in claim 1, wherein the power converter circuit is a step-up and down type DC/DC converter (Single Ended Primary Inductor Converter (SEPIC)).

7. The power converter apparatus as claimed in claim 1, wherein the power converter circuit further includes a fourth series circuit of a third inductor and a fifth switch element connected in parallel to the pair of input terminals, and wherein the switching circuit further switches a voltage between both ends of the fifth switch element by using a sixth switch element and outputs a switched voltage.

8. The power converter apparatus as claimed in claim 7, further comprising a second control circuit being configured to generate a pair of second gate control signals for driving the third and fourth switch elements in an inverted relationship with each other in synchronization with two pairs of third gate control signals supplied to the first and second switch elements and the fifth and sixth switch elements.

9. The power converter apparatus as claimed in claim 7, wherein the applied voltage $V1$ is set to a value between $V1=(1+a) \times Vin$ and $(1+3a) \times Vin$, where the input voltage is Vin, an inductance of the first inductor is L1, an inductance of the second inductor is L2, and a positive coefficient is "a".

10. The power converter apparatus as claimed in claim 7, wherein the applied voltage $V1$ is set to a value of $V1=(1+2a) \times Vin$, where the input voltage is Vin, an inductance of the first inductor is L1, an inductance of the second inductor is L2, and a positive coefficient is "a".

11. The power converter apparatus as claimed in claim 7, wherein the power converter circuit is an interleaved step-up DC/DC converter.

12. The power converter apparatus as claimed in claim 1, wherein the power supply apparatus is a voltage converter circuit being configured to convert the input voltage into the predetermined applied voltage and apply a converted applied voltage to the second capacitor.

13. The power converter apparatus as claimed in claim 1, wherein the power supply apparatus is a voltage converter circuit being configured to convert the output voltage into the predetermined applied voltage and apply a converted applied voltage to the second capacitor.

14. The power converter apparatus as claimed in claim 1, wherein the power converter circuit further includes a current detector that detects a current at the pair of input terminals, and wherein the ripple cancellation current generator circuit further includes a third control circuit being configured to adjust the applied voltage based on the current detected by the current detector.

\* \* \* \* \*